Patented June 10, 1952

2,599,810

UNITED STATES PATENT OFFICE 2,599,810

STABILIZATION OF CROPS

Joseph A. Chenicek, Bensenville, and William K. T. Gleim, Orland Park, Ill., assignors to Universal Oil Products Company, Chicago, Ill., a corporation of Delaware No Drawing. Application November 13, 1950, Serial No. 195,478

16 Claims. (Cl. 99—8)

This application is a continuation-in-part of our copending application Serial No. 732,142, filed March 3, 1947, now Patent No. 2,535,058, issued December 26, 1950 and relates to the stabilization of crops and more particularly to a novel method of preserving the desirable qualities thereof.

It has been found that the drying of crops either in the field or in drying equipment results in a loss of valuable food accessory factors. For example, alfalfa looses anywhere from 45% to 85% of its carotene value during the drying treatment. Similarly, carotene is found in sweet potatoes and in other yellow pigmented plants. Vitamin $B_1$ (thiamine hydrochloride) is found in various seeds, grains, nuts, legumes, fruits and vegetables, while vitamin $B_2$ (riboflavin) is found in wheat germ and leafy vegetables. Nicotinic acid (Niacin) is found in wheat germ and in several green leafy vegetables, while vitamin $B_6$ (pyridoxine) is found in whole grain cereals, crude cane molasses, etc. Vitamin C (ascorbic acid) is found in citrus fruits, tomatoes, green peppers and various other fresh fruits and vegetables, and vitamin E is found in wheat germ oil, cotton seed oil, green leafy vegetables and various grains. Vitamin $K_1$ is found in alfalfa, spinach, and other green vegetables. Pantothenic acid is found in crude cane molasses and wheat germ. Several postulated vitamins which have not as yet been completely accepted, such as citrin, gizzard erosion factor, etc., are found in various crops, the citrin being present in citrus foods, and the gizzard erosion factor being present in alfalfa, kale, etc. It is understood that the above is merely a brief reference to the vitamin content of various crops and that these and other crops also may contain other vitamins as, for example, spinach contains vitamins A, $B_2$ later known as vitamin G (riboflavin) and C, beets contain vitamin $B_1$, potatoes contain vitamin $B_2$, parsley, cabbage, and berries contain vitamin C, etc.

In addition to vitamins or in absence of vitamins, various crops contain other desirable substances which tend to deteriorate due to oxidative deterioration. For example, various fatty acids, such as caprylic, capric, lauric, myristic, palmitic, stearic, oleic, linoleic, etc., are found in the oils of coconut, babassu, palm kernel, olive, castor, peanut, rapeseed, cotton seed, corn, soy bean, etc. Alcohols are found in cockfoot grass, wheat lucerne leaf, etc. Various sterols are found in plant oils, ergosterol, for example, being found in soya bean oil. Further, crops may become rancid and lose desirable qualities such as taste, odor, retention of physical shape (non-wilting), etc., due to oxidative deterioration.

The present invention offers a novel method of preventing or retarding the oxidative deterioration of these substances in storage and during manufacture.

In one embodiment the present invention relates to a process for stabilizing crops subject to oxidative deterioration which comprises adding thereto an inhibitor comprising a 5-hydroxy coumaran.

In a specific embodiment the present invention relates to the stabilization of carotene containing crops subject to oxidative deterioration which comprises applying thereto an inhibitor comprising a 5-hydroxy coumaran substituted in the 6-position by a hydrocarbon group of at least 3 carbon atoms.

In a more specific embodiment the present invention relates to the stabilization of alfalfa which comprises spraying alfalfa with an inhibitor comprising 2,2-dimethyl-6-tertiary butyl-5-hydroxy coumaran.

The term "crops" as used in the present invention is intended to include any substance grown from the soil to be used as food for humans or animals, either in the form as gathered from the field or after suitable modification in form, such as by pressing, grinding, pulverizing, slurrying, making into paste, flour, etc.; either used as such or after suitable cooking. Thus the present invention is applicable to the treatment of forage crops, such as alfalfa, clover, hay, fodder, etc.; grains such as corn, wheat, oats, rice, barley, rye, soy beans, etc.; vegetables such as carrots, peas, spinach, beets, potatoes, parsley, cabbage, etc.; fruits including both small fruits and those grown on trees, such as berries, oranges, lemons, grapefruit, apples, bananas, melons, dates, figs, etc.; nut crops including peanuts, walnuts, pecans, almonds, chestnuts, hazel nuts, etc.; hops, coffee, tea, sugar, tobacco, etc. It is understood that the above crops are merely typical representatives and that the broad scope of the present invention is not intended to be unduly limited to the crops specifically mentioned but is to include all other crops subject to oxidative deterioration.

When the inhibitor is sprayed on the crops in the field, it is preferable to utilize an inhibitor which is not water soluble so that the inhibitor will not be washed away by the rain. The inhibitors of the present invention are not water soluble and therefore are particularly suitable for this purpose. In addition, these inhibitors are wax soluble and therefore will penetrate through the waxy coating of various crops and will enter into the cells of the crops to effect stabilization thereof.

It will be noted that the inhibitors of the present invention are particularly advantageous for use in the stabilization of crops containing carotene and that these inhibitors serve to prevent loss of carotene from the crops and thereby to retain this desirable property. However, it is understood that the inhibitors also serve to retain other desirable properties in the crops as hereinbefore set forth.

In a broad embodiment the inhibitor of the present invention comprises a 5-hydroxy coumaran. Preferably the 5-hydroxy coumaran is substituted in the 6-position by a hydrocarbon group of at least 3 carbon atoms and still more particularly by a branch chain alkyl group.

The chemical structure of the coumaran compounds, together with the numbering of the positions, is illustrated below.

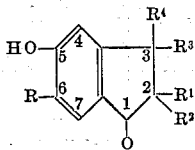

In the chemical structure shown above, R may be hydrogen but preferably is a hydrocarbon radical containing at least 3 carbon atoms, $R^1$, $R^2$, $R^3$ and $R^4$ may be hydrogen, alkyl, aryl, aralkyl, alkaryl, cyclohexyl, etc. and these substituents may themselves be substituted by hydroxy or amino groups.

The inhibitors of the present invention may be prepared in any suitable manner. A preferred method of preparing the substituted hydroxy-coumarans comprises reacting hydroquinone with methallyl chloride in the presence of a suitable salt of a strong base and a weak acid, such as potassium carbonate, to form the corresponding mono-methallyl-ether of hydroquinone. The mono-methallyl-ether of hydroquinone is then rearranged by means of heat to form 2-methallyl-hydroquinone, which is then refluxed in the presence of a suitable acid, such as formic acid, to form 2,2-dimethyl-5-hydroxy coumaran. The hydrocarbon substituent group is added in the 6-position by alkylating with an alcohol of the desired olefin in the presence of a suitable catalyst, such as phosphoric acid. In place of methallyl chloride, methallyl bromide may be used and, in place of the alcohol for alkylation, the olefin or other olefin-producing substance may be employed. The following examples show the preparation of specific compounds in detail.

2,2 - dimethyl - 6 - tertiary - butyl - 5 - hydroxy-coumaran was prepared as follows: 1 mol of hydroquinone, 1.2 mols of methallyl chloride, 0.51 mol of potassium carbonate and 200 cc. of water were refluxed, while stirring for 48 hours, working in a nitrogen atmosphere being optional. The water layer which was clear and colorless was drawn off and discarded. The hydroquinone methallyl ether-methallyl chloride mixture was dissolved in one liter of ethyl ether and the ether solution was washed, dried and evaporated. One hundred and forty grams of product were obtained which amounts to a yield of 85% based on the hydroquinone. The product was heated slowly to 250° C. and, after cooling, was refluxed in an equal weight of 88% formic acid for 10 hours at 110° C., after which the formic acid was removed by atmospheric distillation. The hydroxy coumaran was then reacted with tertiary butyl alcohol in the presence of 85% phosphoric acid at a temperature of 75-80° C. for one hour to form the desired 2,2 - dimethyl - 6-tertiary butyl-5-hydroxy-coumaran. The final product was recovered after water washing, extraction with ether, water washing, drying, evaporation and recrystallization from alcohol or benzene.

2-methyl-5-hydroxy-coumaran was prepared by first forming the allyl ether of 4-methoxyphenol with allyl bromide in the presence of potassium carbonate and acetone. The compound was rearranged by means of heat to the 2-allyl-4-methoxyphenol which in turn was transformed into 2-methyl-5-hydroxy coumaran by refluxing in glacial acetic acid and hydrogen bromide.

Preferred inhibitors of the present invention comprise 6-butyl-5-hydroxy coumarans including 2 - methyl -6- tertiary-butyl-5-hydroxy-coumaran, 2,2-dimethyl-6-tertiary-butyl-5-hydroxy-coumaran, 2 - methyl - 6-secondary-butyl-5-hydroxy-coumaran, 2,2 - dimethyl - 6 - secondary-butyl-5-hydroxy-coumaran, 2-methyl-6-isobutyl-5 - hydroxy - coumaran, 2,2-dimethyl-6-tertiary-butyl-5-hydroxy-coumaran, etc., as well as other branched chain substituted compounds including 2 - methyl-6-isopropyl-5-hydroxy-coumaran, 2,2 - dimethyl - 6 - isopropyl - 5 - hydroxy - coumaran, 2 - methyl - 6 - tertiary-amyl-5-hydroxy-coumaran, 2,2-dimethyl - 6 - tertiary-amyl-5-hydroxy-coumaran, etc. Other satisfactory inhibitors include those in which the alkyl substituent in the 6-position comprises a radical selected from n-propyl, n-butyl, n-amyl, etc.

It is understood that the various inhibitors which may be prepared and used within the broad scope of the present invention are not necessarily equivalent in their activity but that they all will serve to stabilize the crops in some degree.

The inhibitor is sprayed or dusted on the crops either before or after cutting. When desired, the inhibitor may be dissolved in a suitable non-toxic organic solvent or emulsified with a suitable wetting agent. As these inhibitors are soluble in most organic solvents, the particular solvent to be used in a given instance will depend primarily upon the effect the solvent may have on the crops and secondarily on the cost thereof. A light hydrocarbon naphtha or kerosene which is volatile and thus will evaporate to leave the inhibitor absorbed in the crops may be employed, although alcohols, glycerine, glycols, ethers, aldehydes, ketones, etc. which meet the desired requirements may be used. Propylene glycol is a preferred solvent for this purpose. When utilized as an emulsion, the inhibitor may be commingled with a wetting agent such as Aerosol, Nacconol, Santomerse, etc. or those of the gardinol type and, in fact, with any suitable non-toxic wetting agent. In still another embodiment the inhibitor may be emulsified with water and then used as a spray or made in a solution with the various solvents hereinbefore set forth and then emulsified with the wetting agent, with or without a solutizing agent, and utilized as such or in a solution or emulsion with water. For dusting, the inhibitor or a solution or emulsion thereof as hereinbefore set forth may be admixed with suitable inert material, such as clays.

The inhibitor may be sprayed or dusted by hand or from aeroplanes or by any other suitable method in order to distribute the inhibitor in finely divided particles over the crops, either as droplets or as finely divided solid particles. The inhibitor will penetrate throughout and within the leaves, seeds, etc., of the crops and will thereby serve to preserve the desirable qualities, not only of the leaves themselves, but also of the oils and the like obtained from the crops. Similarly, the inhibitor will penetrate into the larger produce such as oranges, lemons, melons, apples, pears, etc., and thereby will serve to preserve the vitamin content and other desirable properties thereof.

The inhibitors may be sprayed or dusted alone or in combination with insect or weed killing materials. In some cases, the insect or weed killing material may serve as a solvent for the inhibitor as, for example, when it is desired to use a hydrocarbon fraction, such as kerosene, for this purpose. It is understood that the inhibitor may be used in conjunction with inhibitor activators or synergists, such as phosphoric acid, ascorbic acid, citric acid, esters of these acids, etc. It is also understood that these inhibitors may be used along with other inhibitors such as propyl gallate, NDGA (nordihydroguaiaretic acid), lauryl thio-dipropionate, thio-dipropionic acid, 2-tertiary butyl-4-methoxyphenol, etc.

It is understood that the spraying or dusting of the crops may be done while the crops are in the field, either prior to or after cutting, or that the inhibitor may be applied after the crops have been gathered and stored. The amount of inhibitor to be applied to the crops may vary considerably, but in general will range from about 0.0001% to about 0.1% by weight of active ingredient.

The following example is introduced to illustrate further the novelty and utility of the present invention but not with the intention of unduly limiting the same.

*Example I*

This run was made by charging 100 grams of alfalfa into a one gallon rotating drum to which 0.02% by weight of 2,2-dimethyl-6-tertiary butyl-5-hydroxy coumaran was sprayed by means of a spray gun. The inhibitor was prepared in the manner hereinbefore set forth and was further prepared as a solution in 100 ml. of acetone. In order to prevent wetting of the alfalfa by the acetone the run was made in the presence of air introduced at a rate of about 10 ml. per minute. The carotene determinations were made according to the method described in Analytical Chemistry 19, No. 3, 170 (1947).

The alfalfa had an original content of 285 parts per million of carotene. The alfalfa was divided into different samples and the samples were stored at 100° F. Analyses were made after 4, 8 and 60 days. The results of these analyses are given in the following table.

*Table I*

| Sample | Carotene Content, parts per gram, after— | | |
|---|---|---|---|
| | 4 days | 8 days | 60 days |
| Acetone alone—control | 235 | 225 | 100 |
| Inhibited with 2,2-dimethyl-6-tertiary-butyl-5-hydroxy coumaran | 250 | 235 | 130 |

From the above data it will be noted that the carotene content of the alfalfa dropped from 285 to 100 parts per million in 60 days. On the other hand, the alfalfa inhibited with 2,2-dimethyl-6-tertiary butyl-5-hydroxy coumaran dropped to only 130 parts per million after 60 days, thus representing a 13% greater carotene content over the non-inhibited alfalfa.

The particular alfalfa used in this example had been stored for some time before the runs reported above were made. It is preferred that the inhibitor be added to the alfalfa promptly after cutting and, in such cases, the beneficial effects obtained by the use of the inhibitor will be even greater and thus will serve to inhibit to a considerable extent the loss of carotene in the alfalfa.

We claim as our invention:

1. A process for stabilizing crops subject to oxidative deterioration which comprises applying thereto an inhibitor comprising a 5-hydroxy-coumaran substituted in the 6-position by a branched chain alkyl group.

2. A process for stabilizing crops subject to oxidative deterioration which comprises applying thereto an inhibitor comprising a 5-hydroxy-coumaran substituted in the 6-position by a hydrocarbon group of at least 3 carbon atoms.

3. A process for stabilizing crops subject to oxidative deterioration which comprises applying thereto an inhibitor comprising a 6-butyl-5-hydroxy-coumaran.

4. A process for stabilizing crops subject to oxidative deterioration which comprises applying thereto an inhibitor comprising 2,2-dimethyl-6-tertiary butyl-5-hydroxy-coumaran.

5. A process for stabilizing carotene-containing crops subject to oxidative deterioration which comprises distributing over the crops finely divided particles of an inhibitor comprising a 5-hydroxy-coumaran substituted in the 6-position by a hydrocarbon group of at least 3 carbon atoms.

6. A process for stabilizing carotene-containing crops subject to oxidative deterioration which comprises distributing over the crops an inhibitor comprising 2-methyl-6-tertiary-butyl-5-hydroxy-coumaran.

7. A process for stabilizing carotene-containing crops subject to oxidative deterioration which comprises distributing over the crops an inhibitor comprising 2,2-dimethyl-6-tertiary-butyl-5-hydroxy-coumaran.

8. A process for stabilizing alfalfa to prevent loss in carotene which comprises spraying the alfalfa with an inhibitor comprising a 5-hydroxy-coumaran substituted in the 6-position by a hydrocarbon group of at least 3 carbon atoms.

9. A process for stabilizing alfalfa to prevent loss in carotene which comprises spraying the alfalfa with an inhibitor comprising a 6-butyl-5-hydroxy-coumaran.

10. A process for stabilizing alfalfa to prevent loss in carotene which comprises spraying the alfalfa with an inhibitor comprising 2,2-dimethyl-6-tertiary-butyl-5-hydroxy-coumaran.

11. A process for stabilizing alfalfa to prevent loss in carotene which comprises spraying the alfalfa with an inhibitor comprising 2-methyl-6-tertiary-butyl-5-hydroxy-coumaran.

12. Crops normally subject to oxidative deterioration and containing as an inhibitor against such deterioration a 5-hydroxy-coumaran substituted in the 6-position by a branched chain alkyl group.

13. Crops normally subject to oxidative deterioration and containing as an inhibitor against such deterioration a 5-hydroxy-coumaran substituted in the 6-position by a hydrocarbon group of at least 3 carbon atoms.

14. Alfalfa containing, as an inhibitor against oxidative deterioration of its carotene content, a 6-butyl-5-hydroxy-coumaran.

15. Alfalfa containing, as an inhibitor against oxidative deterioration of its carotene content, 2-methyl-6 - tertiary - butyl - 5 - hydroxy - coumaran.

16. Alfalfa containing, as an inhibitor against oxidative deterioration of its carotene content, 2,2-dimethyl-6-tertiary-butyl-5 - hydroxy - coumaran.

JOSEPH A. CHENICEK.
WILLIAM K. T. GLEIM.

REFERENCES CITED

The following references are of record in the file of this patent:

UNITED STATES PATENTS

| Number | Name | Date |
|---|---|---|
| 2,320,746 | Paul | June 1, 1943 |
| 2,421,812 | Smith et al. | June 10, 1947 |
| 2,513,002 | Chenicek | June 27, 1950 |